F. HAECK.
Aging Liquors.
No. 60,179.   Patented Dec. 4, 1866.
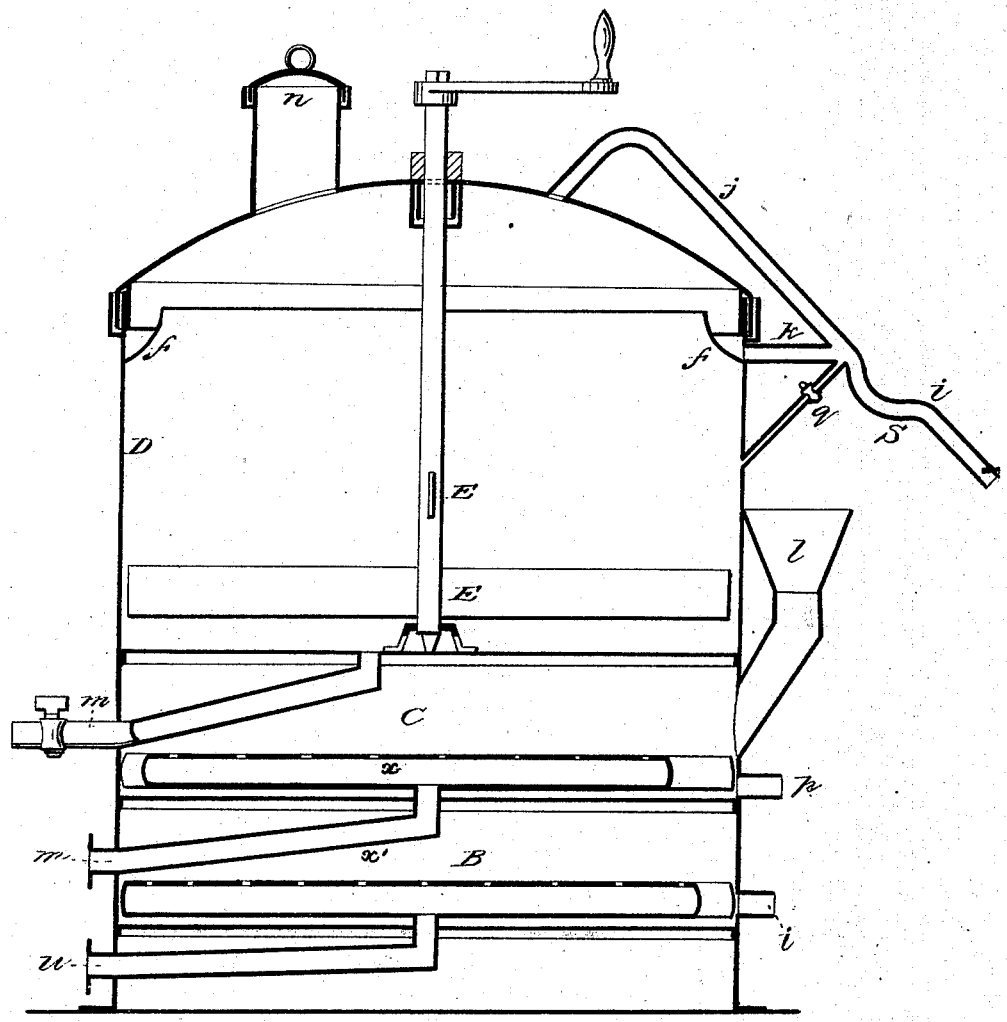

United States Patent Office.

IMPROVED METHOD OF IMPARTING AGE TO WINES.

FRANCOIS HAECK, OF BRUSSELS, BELGIUM.

Letters Patent No. 60,179, dated December 4, 1866.

SPECIFICATION.

TO ALL WHOM IT MAY CONCERN:

Be it known that I, FRANCOIS HAECK, of the city of Brussels, province of Brabant, kingdom of Belgium, have invented a new and useful improvement in giving Age to and Improving Wines and Distilled Liquors or Spirits; and I do hereby declare that the following is a full, clear, and exact description of the same, reference being had to the accompanying drawing, which forms part of this specification, and which represents in vertical section an apparatus in illustration of my mode of operation.

It is well known that wines made from the grape or other fruit, as also distilled spirits, need considerable time after fermentation to deposit their yeast, and that they acquire their best qualities only by being allowed to remain in vessels for a lengthened period, extending, it may be, to years. The reason of this in part is that several invisible, ethereous, and volatile substances require to be slowly evaporated, generally through the pores of the vessel containing the wine or spirit, and, while this process is going on, what is termed the "second yeast" is being gradually deposited. This is the natural or ordinary process by which the wine or spirit, or other fermented liquor, becomes aged and improved. It, however, is a very tedious and inconvenient one, and any readily available mode of producing a like result within a comparatively short period of time, must be considered an improvement. Several methods of doing this have been tried, but all have in some one respect or another been found imperfect. Some have been too laborious and expensive.

The following description will suffice to explain my improvement: I subject the new wine or other newly-distilled liquor, after it has passed the usual alcoholic fermentation, to a gradual heating, till it reaches a temperature of from 45° to 90° (forty-five to ninety degrees) centigrade, more or less. This may be done by the apparatus shown in the accompanying drawing, in which the portion marked D is a chamber made, say of wood or metal, in which the young wine or liquor to be treated is put, avoiding, so far as possible, the introduction of air by stirring or otherwise. With the new wine should also be put all the deposits the wine may have had previously, as these deposits contain not only invisible ethereous substances, but also aromatic ones, which give the "bouquet" to the wine, and which, after expelling the bad-tasting substances, have to be dissolved or united with the wine. As soon as the chamber D is filled to within about two or three inches from its upper edge, the opening $n$ is closed. Water is or may have been previously admitted by a funnel, $l$, into a chamber, C, beneath the vessel, D. Steam is now admitted by means of a pipe, $n$, connected with a steam boiler and distributor, $x'$, into a chamber, B, arranged below the water space C, the water in which thus becomes slowly heated, and through it still more gradually the wine in the vessel D. Whilst the wine is being thus heated it should be constantly kept in motion by slowly rotating a stirrer, E, which prevents the yeast settling on the bottom of the chamber D, and keeps it mixed up with the wine. In some cases steam may be admitted direct into the chamber C, by means of a pipe, $m$, and perforated distributer, $x$, or said pipe and distributer may be used to discharge the water from the chamber C. The chamber B may be provided with a steam-escape aperture, $l'$, to serve in part a similar office to that of the water-supplying funnel $l$, of allowing to escape superfluous steam and expanded air. An opening, $p$, may be made in the chamber C for the insertion of a thermometer to test the temperature. As soon as condensed vapors make their appearance in the shape of drops on or outside the vessel D, the temperature of the water should be observed and regulated so that the condensed vapors do not run in other than a thin stream, or, preferably, slowly, in drops only. These condensed vapors are the product of ethereous, oily, and acidulous substances, bad smelling and bad tasting, and injurious in their action on the brain, and the heating of the wine should be continued until the condensed vapor is of good taste and odor. The condensed vapors are collected in drops in a gutter or channel, $f$, and from thence conveyed by means of pipes, $i$ and $k$, to a suitable refrigerator. The pipe $k$ has a branch, $q$, to return to the chamber D the condensed vapors when they cease to have a bad taste and odor. This branch should be provided with a faucet. Another pipe, $j$, projecting from the top of the chamber D, and joining the pipe $i$, serves to let the expanded air escape from the vessel D. A bend at $s$ is made in the pipe $i$, which, collecting liquid, serves to hermetically seal the pipe $i$. The stirrer-shaft should also be closely packed where it projects through the top of the vessel D. The wine, after it has been sufficiently treated, is run off by a discharge pipe, $m$. The process here described may, if preferred, be conducted in vacuo, so as to accomplish a like result with the lowest possible temperature. After the wine has been deprived by the process herein described of its objectionable qualities, it is allowed to cool and emptied into, say, barrels or casks, which have been carefully cleaned by boiling water or steam. It is then put into as cool a place as possible, where it may be permitted to remain two or three months, till all the remaining yeast has been deposited, when it will be found to have acquired all the qualities of wine laid up for years. As with the evaporation of the invisible volatile substances, necessarily a small portion of alcohol is likewise evaporated and lost, a small addition of pure alcohol may be added prior to its treatment under this process, if it is desired to maintain the original strength. It may be observed, that prior to cooling down and running off the wine from the vessel D, it is desirable to disengage or destroy by a continued heating the organic matter in the yeast, and by moderate agitation to dissolve in the wine certain aromatic substances now contained in the yeast. As soon, however, as the suspended organic matters in the liquid begin to be heavier than the liquid, and deposit themselves rapidly, the heating of the wine should be stopped. The wine may be allowed to cool while the stirrer is still kept in motion. Sickly or spoiled wines, and young or new beer, may also be improved by this, my mode of treatment, that may be more or less varied to suit the article under operation, the principle of action, however, being in all cases the same.

What I claim is—

1. The treatment substantially as herein described, of wines, spirits, and other distilled liquors, by subjecting them to heat, or heat and agitation combined, when the same is effected in a close vessel or chamber, D, gradually heated in the manner described, or in any other equivalent way, and the condensed vapors collected at or near the top of the wine-chamber, and run off therefrom, essentially as and for the purposes set forth.

2. Gradually heating the vessel or chamber containing the wine or distilled liquor to be treated by means of steam and water combined, substantially as specified.

3. The employment within the evaporating chamber D, of a stirrer E, in combination with a suitable heating device below said chamber, and condensed vapor-collecting channel or receptacle at or near the top thereof, essentially as herein set forth.

FRANCOIS HAECK.

Witnesses:
   AARON GOODRICH,
   T. ROSIMONT.